United States Patent Office 2,872,956
Patented Feb. 10, 1959

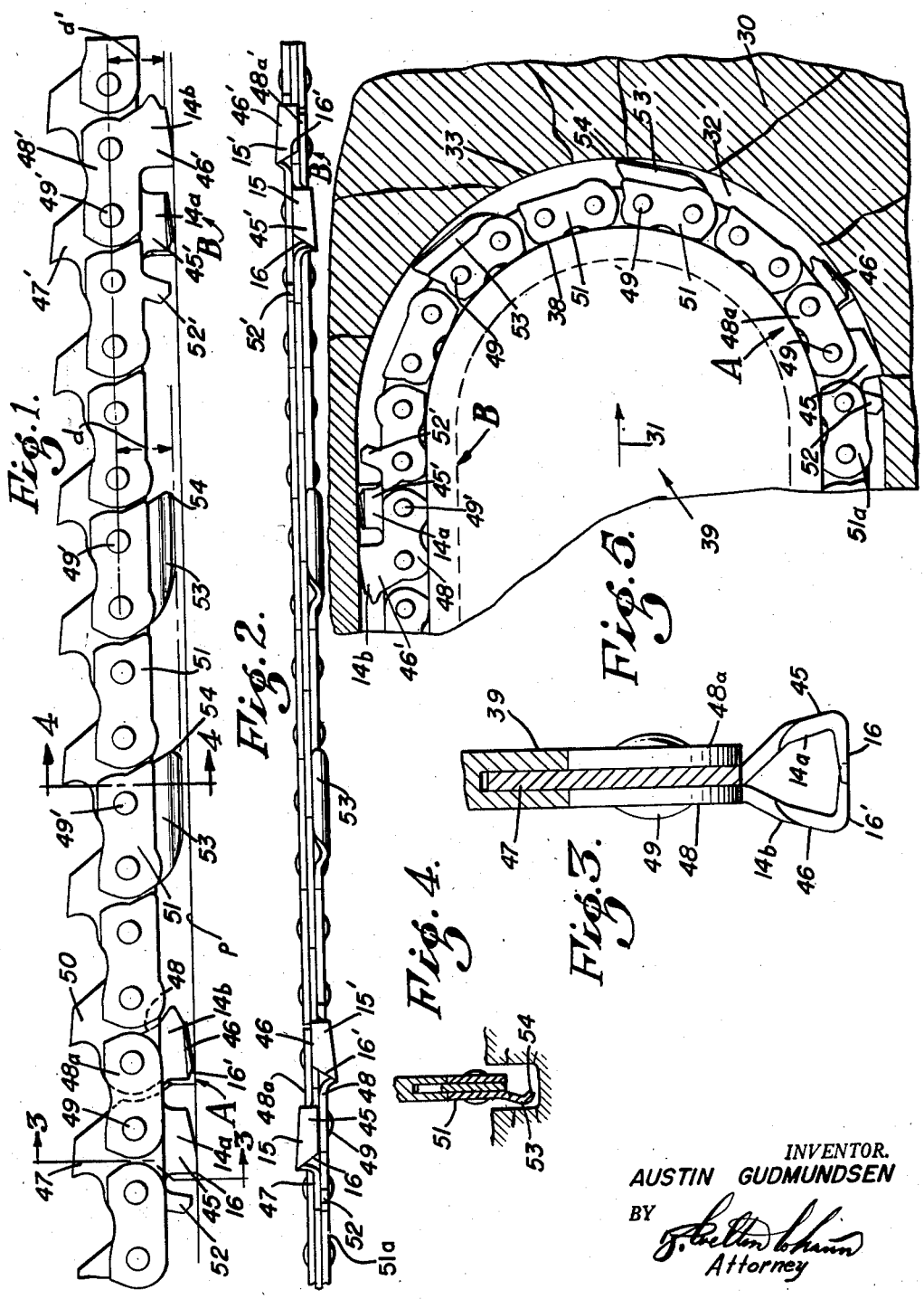

2,872,956
SAW CHAIN

Austin Gudmundsen, Inglewood, Calif., assignor to McCulloch Motors Corporation, Los Angeles, Calif., a corporation of Wisconsin Application June 6, 1955, Serial No. 513,305

7 Claims. (Cl. 143—135)

This invention relates to improvements in saw chains having saw teeth or cutters mounted on the links of a chain.

It is an object of the invention to provide a saw chain which is capable of cutting faster with the same input than a saw chain of equivalent size in use prior to my invention. For example, in a chain saw of a size commonly used for tree felling and bucking, the saw chain extensively employed in logging operations in the northwest woods is approximately forty percent slower in its cutting rate than the chain made in accordance with the present invention.

It is an object of the invention to provide a saw chain which will efficiently cut and bore, having cutting units, each consisting of a pair of articulated allochiral cutters mounted on overlapping links of the chain and being adapted to first cut and lift one side of a ribbon of wood from the bottom of the kerf, and then sever the remaining side of the ribbon at precisely the same level as the first cut, thus cleanly releasing the ribbon-like chip from the wood so that it may be easily and efficiently removed from the kerf.

It is an object of the invention to provide a saw chain having a plurality of cutting units each consisting of a link carrying a leading cutter and an overlapping articulated link carrying a finishing cutter, in opposite hand relation, and a plurality of connecting links between each cutting unit and the succeeding cutting unit, spacing the cutting units apart so as to form therebetween sections or compartments to receive the ribbons which have been cut from the kerf bottoms by the cutting units, and to convey the ribbons out of the kerf in such a manner that the accumulation of the cuttings or ribbons in the kerf will not interfere with the cutting action of the saw chain.

The invention not only provides a chain having a very smooth cutting action, but also one which is of marked self-feeding character so that it is not necessary for the saw operator to bear down heavily upon the saw so as to force the cutters into the wood. A further feature of the invention consists in the provision of allochiral cutting units wherein the leading cutter serves as a depth gauge for the finishing cutter and wherein the force tending to rotate the finishing cutter outwardly in the plane of the saw bar is balanced by force acting through the leading cutter. Also, the cutting actions of the cutters are balanced so that the saw chain does not tend to pull to one side but will cut straight ahead. This is accomplished by the provision of cutting units formed of allochiral cutters, the cutting units being likewise in allochiral relation. That is to say, the leading cutter of each cutting unit is of opposite hand to the leading cutter of the preceding cutting unit. The reduction in lateral vibration of the chain and its supporting blade is an additional important feature of the invention contributing to greater cutting efficiency. Lateral chain vibration in many chain saws now in use results in the cutting of a kerf which is wider at the rear end than at the front; whereas the chain herein disclosed is characterized by the cutting of a kerf which is substantially the same width from end-to-end thereof.

It is a further object of the invention to provide a saw chain adapted for efficient operation at high speed wherein the novel allochiral cutting units are spaced apart at a distance so that the length of each ribbon conveying compartment or section will be a multiple of the length of the cutter unit. This relationship is achieved by placing a plurality of connecting links between succeeding cutting units. In the operation of the chain of the present invention each consecutive cutting unit is enabled to remove a ribbon from the full length of the bottom of the kerf, with such consistency that each cutting unit upon each pass through the kerf adds to the depth thereof.

A further object of the invention is to provide a saw chain having cutting units, each employing cooperating cutters to lift a ribbon-like chip from the kerf bottom, the cutting units being spaced apart by connecting links one or more of which has thereon a longitudinally elongated runner which moves through the kerf without performing any cutting action, but contributes to smoothness in the operation of the saw during straight-cutting and also in boring. In the form of the chain contemplated for use in the cutting of hard woods, the depth of cut of each cutting unit is reduced so that there is a corresponding reduction in the volume of the chip removed thereby. Likewise, the spacing between cutting units is decreased so that the use of an intermediate runner is not used.

A further object of the invention is to provide a runner of novel elongated form and placement. In addition to being longitudinally elongated, this novel runner is arranged in alignment with the shank of the preceding finishing cutter and is similarly offset from the longitudinal central plane of the chain in such position that it will pass forwardly along one side of the ribbon cut by the preceding cutting unit, while at the same time assisting in urging the ribbon forwardly in the kerf and thereby assisting in the discharge of the ribbon or chip from the kerf in an efficient manner. A further feature of this novel runner is that it does not require filing as the cutters are sharpened and thereby reduced in height. These runners are likewise characterized by increased extension during boring operation of the chain.

Further objects and advantages of the invention may be brought out in the following part of the specification wherein small details have been described for the competence of disclosure, without intending to limit the scope of the invention which is set forth in the appended claims.

Referring to the accompanying drawings which are for illustrative purposes only:

Fig. 1 is an elevational view showing a portion of a saw chain, according to the present invention;

Fig. 2 is a bottom plan view corresponding to Fig. 1;

Fig. 3 is an enlarged fragmentary sectional view taken as indicated by the line 3—3 of Fig. 1, showing the leading and following cutters extending downwardly from links of the chain;

Fig. 4 is a fragmentary sectional view taken as indicated by the line 4—4 of Fig. 1, showing a runner; and Fig. 5 is a fragmentary sectional view showing the positions of chain parts during boring operations.

In Figs. 1 and 2, I show a chain including my new cutting unit A which consists of leading and finishing cutters 45 and 46 articulated in close relation in such a manner as to avoid use of a gauge between the leading and finishing cutters. The cutters are arranged so that the leading cutter 45 serves as depth gauge for the following or finishing cutter 46. The cutters 45 and 46 are formed on overlapping or directly articulated links 47 and 48, or in other words, on overlapping side and center links. Although the link 47 which carries the leading cutter 45 is shown as a center link and the link 48 which carries the finishing cutter 46 is shown as a side link, it will be recognized that this arrangement may be reversed and that the leading cutter may be formed on a side link, with the following or finishing cutter being formed on the succeeding center link. The overlapping links 47 and 48 are articulated upon a pintle 49. Lying opposite the side link 48, there is a plain side link 48a. The side links 48 and 48a connect the center link 47 with the next succeeding center link 50.

A plurality of center links 50 and side links 51 connect the cutting unit A with a cutting unit B which is allochiral to the cutting unit A in that it has articulated leading and following cutters 45' and 46' which correspond to the cutters 45 and 46 except that they are respectively on opposite sides of the chain. The cutters 45' and 46' are supported upon overlapping links 47' and 48', there being a plain link 48a' opposite the link 48'. A pintle 49' connects the link 47' with the side links 48' and 48a'.

Ahead of the leading cutter 45 there is a depth gauge 52, which is formed on the rear end of the side link 51a which overlaps the front end of the cutter link 47, in articulated and laterally offset relation to the leading cutter 45, whereby a better boring action and also maximum cutter length are obtained. There is no depth gauge between the leading and finishing cutters 45 and 46, but they are arranged so close together that the leading cutter 45 serves as a depth gauge for the finishing cutter 46. There is a similar allochiral depth gauge 52' arranged ahead of the leading cutter 45' of the cutting unit B. Each leading cutter 45 and 45' has a shank 14a and each following cutter 46 and 46' has a shank 14b. From the respective shanks of the leading and following cutters of the cutting units A and B blade or toe portions 15 and 15' extend inwardly toward the central longitudinal plane of the chain and have cutting edges 16 and 16' arranged so as to lie in the same horizontal plane P, so that the leading cutter 45 or 45' will cut and lift one side of a ribbon from the bottom of a kerf and the following cutter 46 or 46' will sever and lift the remaining side of such ribbon.

A further feature of the invention is the spacing of the cutting units A and B, which have previously been described herein, far apart in the chain structure by the use of a plurality of connector links, thereby adapting the chain for high speed use. This chain may be employed in an engine driven saw device wherein the chain-driving sprocket is driven at the same speed as the engine crankshaft. I have in Figs. 1 and 2 shown the cutting units A and B connected by a plurality of connector links 50 and 51, the spacing between the cutting units A and B being determined with relation to the velocity at which the chain is to be driven. In this chain, possibility of bumping action of the cutting units due to their being spaced far apart is avoided by placing a number of longitudinally elongated runners 53 on the chain between the cutting units. The runners 53 are curved as shown in Fig. 4 and each have a toe portion 54 arranged below the end of the link 51 on which the runner 53 is formed, in rearwardly (rightwardly) offset relation to the pintle 49' at the contiguous end of the link 51. The distance d, Fig. 1, of the runner toe 54 from the center line of the pintles 49 and 49' is made substantially the same as the distance d' of the rear ends of the cutters 45, 46, 45' and 46' from the pintles' center line, so that it will not be necessary to file down the runners as the cutters are sharpened by filing the front ends thereof.

In Fig. 5, the chain is shown extending around the rounded end 38 of a saw bar 39. The offset toe portion 54 of each runner 53 will be caused to project further outward from the line of the pintles when the chain is caused to travel around the end of the saw blade 39, for the reason that as the link 51 which carries the runner 53 is rotated in clockwise direction around the pintle 49', its toe 54 will swing outwardly from the position in which it is shown in Fig. 1.

As the cutting units A and B pass around the end 38 of the cutter bar or blade 39 they are capable of boring directly into a body such as the log 30 shown in Fig. 5. If the bar 39 with the chain running thereon is moved in the direction of the arrow 31, the cutters will cut a kerf 32 which will form a gradually deepening cavity which may be extended through the log 30 from one side to the other thereof, providing the saw bar 39 is of sufficient length. During this boring operation, the toes 54 of the runners 53 will engage the kerf bottom 33, thereby preventing the connecting links 51 from dragging along the kerf bottom 33 and maintaining the chain in proper relation to the kerf bottom so that as the cutting units come into operation they will cut in a consistent manner.

When the chain as shown in Figs. 1 to 3, is cutting, the reactions against the cutting edges 16 and 16' tends to rotate the cutters 45 and 46 in counterclockwise direction. The reaction against the finishing cutter 46, in a direction to swing the cutting edge 16' thereof outwardly and downwardly in the plane of the saw bar 39, is balanced by the force which passes inwardly or upwardly through the pintle 49 to the forward end of the link 48 which carries the finishing cutter 46. The balancing force is received by the pintle 49 from the rear end of the link 47 which supports the leading cutter 45 and which tends to rotate in counterclockwise direction. Therefore the cutters of each cutting unit are balanced not only laterally but in the plane of the saw bar.

Where the chain is to be used for the cutting of hard woods, the depth of the cut taken by each cutting unit will be decreased. The thickness of the shaving or ribbon removed by each cutting unit will be therefore decreased and its volume will be likewise reduced. To compensate for the reduction in the volume of wood cut by each cutting unit in making a single pass through the kerf, the cutting units are placed closer together.

I claim:

1. In a saw chain: a plurality of cutting units, each cutting unit comprising a leading link and a following link connected thereto in overlapping, articulated relation, one of said links being a side link and the other being a center link, a leading cutter on said leading link comprising a shank portion and a toe portion adapted to lift one side of a ribbon from the bottom of a kerf, and a finishing cutter on said following link comprising a shank portion and a toe portion adapted to lift the remaining side of said ribbon; depth gauges for said leading cutters, said finishing cutter being arranged close to said leading cutter so that the leading cutter acts as a depth gauge for the finishing cutter; and link means connecting said cutting units in spaced relation so as to provide ribbon conveying chambers following the cutter units.

2. In a saw chain: a plurality of allochiral pairs of cutting units, each cutting unit comprising a leading link and a following link connected thereto in overlapping articulated relation, a leading cutter on said leading link having a bottom cutting portion and a corner cutting portion adapted to lift one side of a ribbon from the bottom of the kerf, and a finishing cutter on said following link having a bottom cutting portion and a corner cutting portion in allochiral relation to said leading cutter adapted to lift the remaining edge of said ribbon; depth gauges for said leading cutters, said finishing cutter being arranged close to said leading cutter so that the leading cutter acts as a depth gauge for the finishing cutter; and links connecting said cutting units in series in the chain forming ribbon conveying chambers following each of the cutting units of a length which is at least twice that of one of said cutting units.

3. In a saw chain: a plurality of cutting units, each cutting unit comprising a leading link and a following link connected thereto in closely following articulated relation, a leading cutter on said leading link having a bottom cutting portion and a corner cutting portion adapted to lift one side of a ribbon from the bottom of a kerf, and a finishing cutter on said following link having a bottom cutting portion and a corner cutting portion in allochiral relation to said leading cutter adapted to lift the remaining edge of said ribbon; depth gauges for said leading cutters, the rear ends of said cutters being of lesser extension from the chain links than the front ends thereof; and link means each comprising at least two connector links, for connecting said cutting units in spaced relation so as to provide ribbon conveying chambers following the cutter units, at least one of said link means having a runner thereon projecting toward the bottom of the kerf being cut, said runner initially projecting from the chain links a distance approximately the same as the distance the rear ends of said cutters project from the chain links so that it will not be necessary to further reduce the length of said runner.

4. In a saw chain: a plurality of cutting units, each cutting unit comprising a leading link and a following link connected thereto in closely contiguous and articulated relation, one of said links being a side link and the other a center link in the chain, a leading cutter comprising a shank portion extending from said leading link and a toe portion extending from said shank portion toward the central longitudinal plane of the chain adapted to lift one side of a ribbon from the bottom of a kerf, and a finishing cutter comprising a shank portion extending from said following link and an inwardly extending toe portion, in allochiral relation to said leading cutter, adapted to lift the remaining edge of said ribbon; depth gauges for said leading cutters; and links connecting said cutting units in series in the chain, at least one of said connecting links having thereon a runner having a shank portion positioned so as to lie adjacent the side wall of the kerf being cut.

5. In a high speed saw chain: a plurality of cutting units, each cutting unit comprising a leading link and a following link connected thereto in closely following articulated relation, a leading cutter comprising a shank portion extending from said leading link and a toe portion extending from said shank portion toward the central longitudinal plane of the chain adapted to lift one side of a ribbon from the bottom of a kerf, and a finishing cutter comprising a shank portion extending from said following link and an inwardly extending toe portion, in allochiral relation to said leading cutter, adapted to lift the remaining edge of said ribbon; depth gauges for said leading cutters; a plurality of links connecting said cutting units in spaced relation so as to provide elongated ribbon conveying chambers following the cutting units, and a plurality of runners on links between the finishing cutter of each of said cutting units and the depth gauge of the succeeding cutting unit, said runners being elongated lengthwise of the chain and increasing in height from the front toward the rear ends thereof.

6. In a saw chain: a plurality of cutting units, each cutting unit comprising a leading chain link having thereon a leading cutter and a following chain link having thereon an allochiral finishing cutter directly hingedly connected together in such close relation that the leading cutter is a depth gauge for the finishing cutter, each of said cutters having a bottom cutting portion and a corner cutting portion; depth gauges on the chain for said leading cutters; and groups of links connecting said cutting units in spaced relation so as to form a chip conveying chamber following each cutting unit, said groups of links being of such length that the length of each chip conveying chamber is at least twice the length of the cutting unit which precedes it.

7. In a saw chain: a plurality of cutting units, each cutting unit comprising a leading chain link having thereon a leading cutter and a following chain link having thereon an allochiral finishing cutter directly hingedly connected together in such close relation that the leading cutter is a depth gauge for the finishing cutter, each of said cutters having a bottom cutting portion and a corner cutting portion; depth gauges on the chain for said leading cutters; and groups of links connecting said cutting units in spaced relation so as to form a chip conveying chamber following each cutting unit, said groups of links each being of such length that the length of each chip conveying chamber is at least twice the length of each cutting unit which precedes it, at least one of said connecting links having a runner projecting therefrom, said runner extending laterally so as to lie adjacent one side wall of the kerf being cut.

References Cited in the file of this patent

UNITED STATES PATENTS

| | | |
|---|---|---|
| 2,326,854 | Hassler | Aug. 17, 1943 |
| 2,508,784 | Cox | May 23, 1950 |
| 2,565,502 | Johanson | Aug. 28, 1951 |
| 2,589,015 | Merz | Mar. 11, 1952 |
| 2,705,512 | Wolf | Apr. 5, 1955 |
| 2,826,226 | Donley | Mar. 11, 1958 |

FOREIGN PATENTS

| | | |
|---|---|---|
| 822,900 | Germany | Nov. 29, 1951 |